(12) United States Patent
Kodama et al.

(10) Patent No.: US 10,392,296 B2
(45) Date of Patent: Aug. 27, 2019

(54) SEALED STRUCTURAL BODY AND METHOD FOR MANUFACTURING THE SAME

(71) Applicant: HITACHI, LTD., Tokyo (JP)

(72) Inventors: Motomune Kodama, Tokyo (JP); Masanori Miyagi, Tokyo (JP); Takuya Aoyagi, Tokyo (JP); Takashi Naito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 181 days.

(21) Appl. No.: 15/033,167

(22) PCT Filed: Dec. 4, 2013

(86) PCT No.: PCT/JP2013/082526
§ 371 (c)(1),
(2) Date: Apr. 29, 2016

(87) PCT Pub. No.: WO2015/083248
PCT Pub. Date: Jun. 11, 2015

(65) Prior Publication Data
US 2016/0257610 A1 Sep. 8, 2016

(51) Int. Cl.
*B32B 17/06* (2006.01)
*E06B 3/66* (2006.01)
(Continued)

(52) U.S. Cl.
CPC .......... *C03C 17/04* (2013.01); *B32B 1/02* (2013.01); *B32B 7/14* (2013.01); *B32B 17/06* (2013.01);
(Continued)

(58) Field of Classification Search
CPC ...... E06B 3/66; E06B 3/6612; E06B 3/66357; B32B 1/02; B32B 7/14; B32B 2311/04; B32B 2311/06; B32B 2311/08; B32B 2311/12; B32B 2311/16; B32B 2311/20; B32B 2311/24; C03C 3/21; C03C 3/122;
(Continued)

(56) References Cited

U.S. PATENT DOCUMENTS 3,798,114 A * 3/1974 Chvatal .................... C03C 3/12
428/433
6,344,424 B1 2/2002 Goto et al.
(Continued)

FOREIGN PATENT DOCUMENTS

CN  101009318 A  8/2007
CN  101503277 A  8/2009
(Continued)

OTHER PUBLICATIONS

Machine translation of applicant cited reference CN 101009318.*
(Continued)

*Primary Examiner* — Donald J Loney
(74) *Attorney, Agent, or Firm* — Volpe and Koenig, P.C.

(57) ABSTRACT

A sealed structural body has an internal space and is made of glass, wherein at least a part of a boundary between the internal space of the sealed structural body and the outside is separated by a sealing material containing a metal material and a lead-free oxide glass. The lead-free oxide glass contains at least one of element Ag or P, Te, and V.

11 Claims, 7 Drawing Sheets

(51) Int. Cl.
| | |
|---|---|
| C03C 17/04 | (2006.01) |
| C03C 3/12 | (2006.01) |
| C03C 3/21 | (2006.01) |
| C03C 8/24 | (2006.01) |
| B32B 1/02 | (2006.01) |
| B32B 7/14 | (2006.01) |
| B32B 37/14 | (2006.01) |
| B32B 38/00 | (2006.01) |
| C03C 17/00 | (2006.01) |
| C03C 8/02 | (2006.01) |
| C03C 8/08 | (2006.01) |
| C03C 8/18 | (2006.01) |
| C03C 27/06 | (2006.01) |
| E06B 3/663 | (2006.01) |

(52) U.S. Cl.
CPC .......... *B32B 37/14* (2013.01); *B32B 38/0008* (2013.01); *C03C 3/122* (2013.01); *C03C 3/21* (2013.01); *C03C 8/02* (2013.01); *C03C 8/08* (2013.01); *C03C 8/18* (2013.01); *C03C 8/24* (2013.01); *C03C 17/003* (2013.01); *C03C 17/007* (2013.01); *C03C 17/008* (2013.01); *C03C 27/06* (2013.01); *B32B 2250/02* (2013.01); *B32B 2255/20* (2013.01); *B32B 2307/304* (2013.01); *B32B 2307/412* (2013.01); *B32B 2419/00* (2013.01); *B32B 2439/40* (2013.01); *B32B 2457/00* (2013.01); *B32B 2605/00* (2013.01); *C03C 2217/218* (2013.01); *C03C 2217/23* (2013.01); *C03C 2218/32* (2013.01); *E06B 3/66* (2013.01); *E06B 3/6612* (2013.01); *E06B 3/66357* (2013.01); *Y02B 80/22* (2013.01); *Y02B 80/24* (2013.01)

(58) Field of Classification Search
CPC .......... C03C 3/17; C03C 3/125; C03C 17/04; C03C 17/06; C03C 17/007; C03C 17/003; Y02B 80/22; Y02B 80/24
See application file for complete search history.

(56) References Cited

U.S. PATENT DOCUMENTS

| | | | |
|---|---|---|---|
| 8,075,961 B2* | 12/2011 | Sawai | C03C 3/21 428/1.1 |
| 2008/0164462 A1 | 7/2008 | Lee et al. | |
| 2009/0136766 A1 | 5/2009 | Son et al. | |
| 2009/0199897 A1 | 8/2009 | Naito et al. | |
| 2010/0180934 A1 | 7/2010 | Naito et al. | |
| 2010/0331165 A1 | 12/2010 | Lee et al. | |
| 2012/0213951 A1* | 8/2012 | Dennis | C03C 8/04 428/34 |
| 2014/0145122 A1 | 5/2014 | Sawai et al. | |
| 2015/0008573 A1 | 1/2015 | Sawai et al. | |
| 2015/0068665 A1 | 3/2015 | Abe et al. | |

FOREIGN PATENT DOCUMENTS

| | | |
|---|---|---|
| JP | 2000-327363 A | 11/2000 |
| JP | 2006-342044 A | 12/2006 |
| JP | 2008171811 A | 7/2008 |
| JP | 2009126782 A | 6/2009 |
| JP | 2009-209032 A | 9/2009 |
| JP | 2010-184852 A | 8/2010 |
| JP | 2011011925 A | 1/2011 |
| JP | 2011057477 A | 3/2011 |
| JP | 2011126722 A | 6/2011 |
| JP | 2013-032255 A | 2/2013 |
| JP | 2013-136470 A | 7/2013 |
| WO | 9310052 A1 | 5/1993 |
| WO | 2013005600 A1 | 1/2013 |
| WO | 2013111434 A1 | 8/2013 |
| WO | 2013/172034 A1 | 11/2013 |

OTHER PUBLICATIONS

European Search Report for European Patent Appln. No. 13898801.9 dated Jun. 28, 2017.
The Chinese Office Action dated Jul. 31, 2017 for the Chinese Application No. 201380080467.5.
Japanese Office Action for Japanese Patent Application No. 2015-551326 dated May 30, 2017.

* cited by examiner (a)

(b)

(a)

(b)

(a)

(b)

SEALED STRUCTURAL BODY AND METHOD FOR MANUFACTURING THE SAME

TECHNICAL FIELD

The present invention relates to a sealed structural body, a double insulating glass, and a glass container.

BACKGROUND ART

Glass is optically transparent, hardly transmits gas or moisture, and has excellent airtightness. Accordingly, glass is being used in the form of double insulating glass for window glass or display casing, or in packaging for covering a light-emitting element contained in electronic devices, for example.

When used for the above purposes, a plurality of glass members may be bonded with an internal space formed so as to increase thermal insulating property or airtightness. Because the bonding portions also require thermal insulating property or airtightness, a low melting point glass having excellent gas barrier property may be used as bonding material (sealing material).

For example, in Patent Literature 1, sealing material of low melting point glass is irradiated with laser so as to heat and melt the sealing material and to thereby bond glass members. Use of laser enables selective heating of only the laser irradiated portion, thus decreasing the thermal influence on portions other than the bonded portions. Because laser heating involves local heating, the temperature of the low melting point glass may be increased non-uniformly. As a result, thermal stress may be produced, whereby a failure of bonding with the glass members may readily be caused. Accordingly, a filler with low thermal expansion coefficient is added to the low melting point glass so as to avoid bonding failure.

CITATION LIST

Patent Literature

Patent Literature 1: JP 2010-184852 A

SUMMARY OF INVENTION

Technical Problem

In the structure disclosed in the patent literature, a very thin organic element on the order of 0.01 to 0.02 mm is disposed between two planar glass plates, where the thickness of the sealing material is small. However, when a thick component is disposed between the materials to be bonded, or when the materials to be bonded have a complex shape, for example, the thickness of the bonding material layer is increased. In laser heating, the energy absorbed by the glass bonding material decreases exponentially with increasing depth from the laser irradiated surface. Generally, glass has low thermal conductivity. Accordingly, if there is spatial non-uniformity in energy absorption, the temperature distribution of the glass also tends to become spatially non-uniform. Thus, when the bonding material layer is thick, the temperature distribution of the bonding material may become significantly non-uniform, increasing the likelihood of damage to the bonding material or the material to be bonded, or of bonding failure, such as interfacial peeling.

An object of the present invention is to decrease damage to the bonding material or the material to be bonded, and bonding failure even when the bonding material layer is thick.

Solution to Problem

The object is achieved by the invention set forth in the claims.

Advantageous Effects of Invention

According to the present invention, even when the bonding material layer is thick, damage to the bonding material or the material to be bonded, and bonding failure can be decreased.

DESCRIPTION OF EMBODIMENTS

Figure 1:
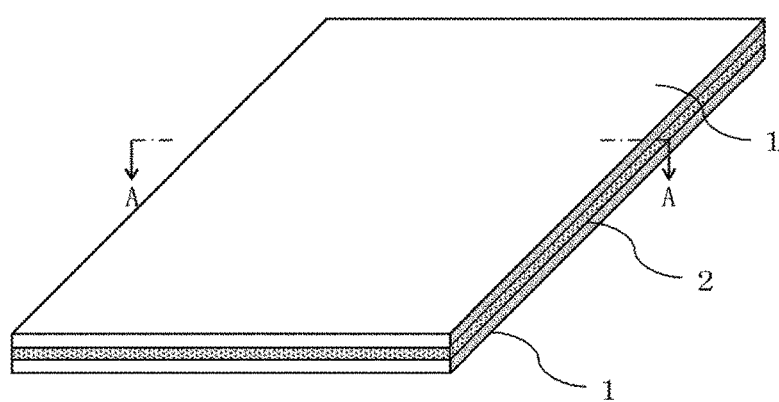
FIG. 1 illustrates an example of a sealed structural body, (a) showing a perspective view and (b) showing a cross sectional view.
Figure 1:
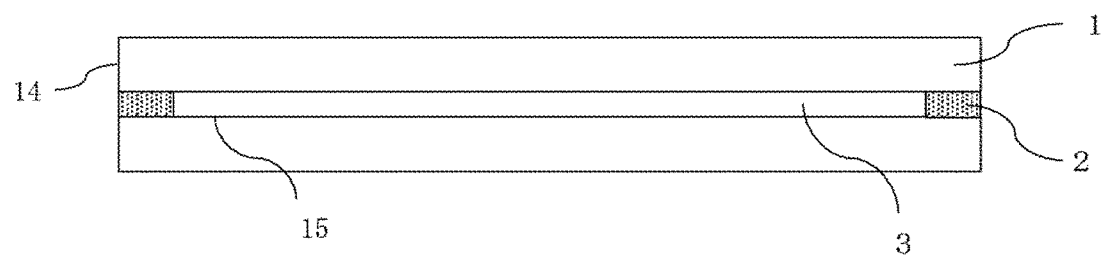
Figure 2:
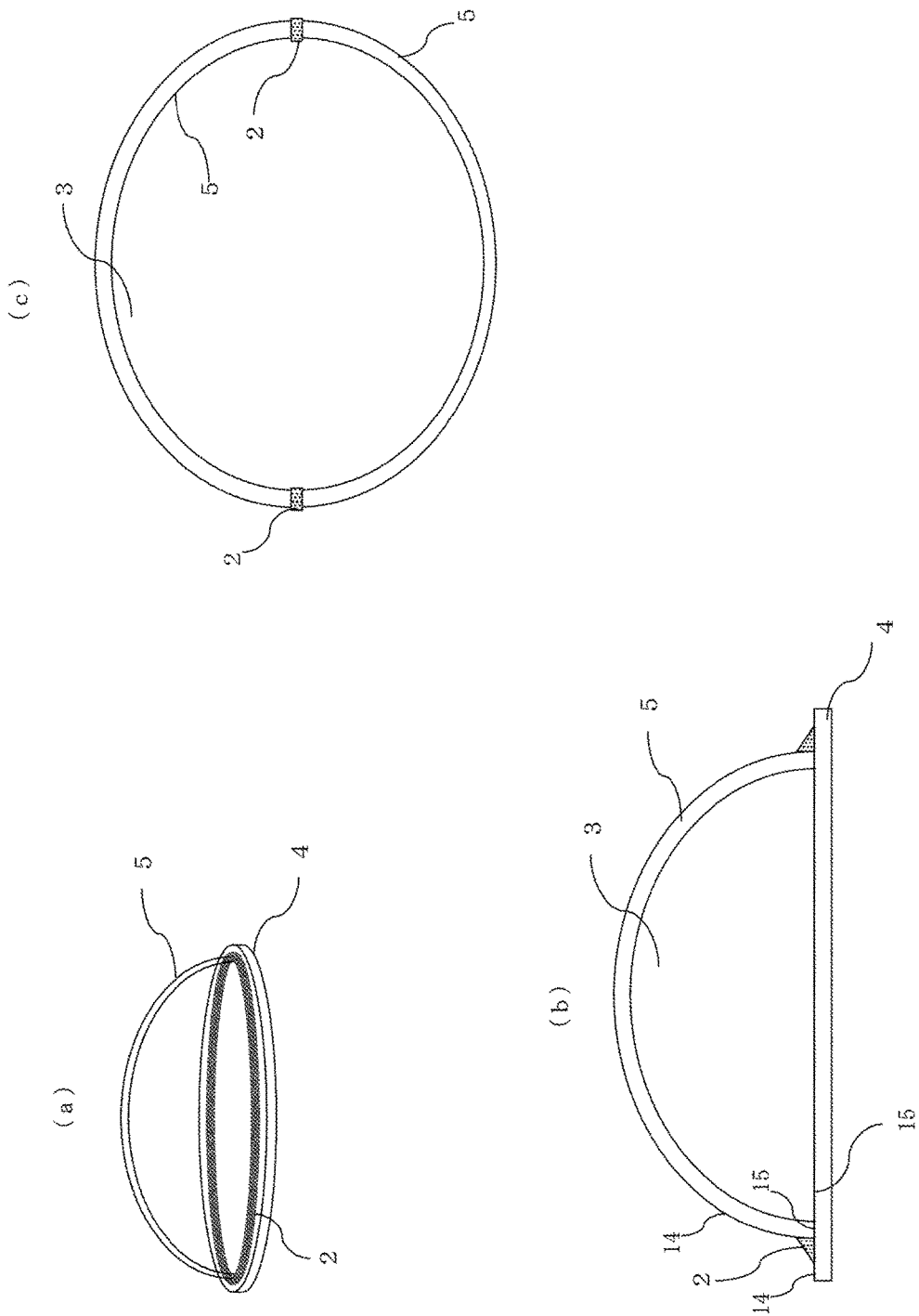
FIG. 2 illustrates an example of the sealed structural body, (a) showing a perspective view and (b) and (c) showing cross sectional views.
Figure 3:
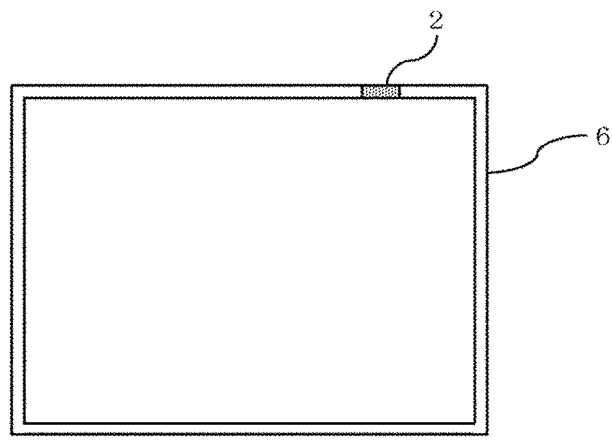
FIG. 3 illustrates an example of the sealed structural body.

While in the following, embodiments of the present invention will be described, the present invention is not limited to the embodiments. A sealed structural body refers to a glass structural body including an internal space separated from the outside by glass, as illustrated in FIGS. 1 to 3. The internal space may be formed by adhering a plurality of glass members using sealing material (bonding material), or by closing an opening of a single glass member with sealing material.

FIG. 1 illustrates an internal space 3 formed between two glass plates 1 the outer peripheries of which are adhered to each other using sealing material 2. FIG. 1(a) is a perspective view of the sealed structural body, and FIG. 1(b) is a cross sectional view taken along line A-A across the glass plates 1 and the sealing material 2. Such a structure is used in a heat-insulated window glass, an OLED display, and the like. In the heat-insulated window glass, normally, soda-lime glass is used for the glass plates 1, and the internal space 3 is either filled with argon gas, which has superior thermal insulating property to atmospheric air, or evacuated. On the other hand, in the OLED display, alkali-free glass is used for the glass plates 1, with an organic light-emitting diode sealed in the internal space 3. Other members may be disposed in the internal space 3, or the internal space 3 may be filled with another atmosphere.

The sealing material 2 may not only bond only opposed surfaces 15 of the glass plates 1, as illustrated in FIG. 1, but the material may also be present outside the sealed structural body (such as being attached to outer faces 14 of the plate glass 1). Instead of at the end portions, the opposed surfaces 15 may be bonded slightly inside the end portions. In other words, it is only required that the internal space 3 and the external space be separated by means of the two glass plates 1 and the sealing material 2.

When the interval of the glass plates 1 is increased, the volume of the sealing material 2 used is also increased. Because the sealing material 2 is irradiated with laser from outside the glass plates 1, the thicker the sealing material 2 becomes in the direction of propagation of laser, the harder it becomes for the laser to reach inside and thereby heat the sealing material 2. Also, it becomes more difficult for the heat provided by the heating of the sealing material 2 on the glass plate 1 side to reach the inside of the sealing material 2. However, by the sealing material having a glass compound and metal particles as will be described below, the sealing material, even when it has a large thickness in the direction of propagation of laser, can be caused to readily absorb laser energy in a spatially uniform manner, and have a spatially uniform temperature distribution. Accordingly, damage to the sealing material or the material to be bonded, and bonding failure such as interfacial peeling can be decreased.

FIG. 2 illustrates the internal space 3 formed by adhering the glass plate 4 and a bowl-shaped glass member 5 to each other with the sealing material 2. FIG. 2(a) is a perspective view of the sealed structural body; FIG. 2(b) is a cross sectional view taken across the glass plate 4, the bowl-shaped glass member 5, and the sealing material 2; and FIG. 2(c) is a cross sectional view of a structural body of bowl-shaped glass members 5 bonded to each other. The structures may be used for containers for insect specimens or ornamental dried flowers, for example. The internal space 3 may have a large size, and provides good internal visibility. By evacuating the internal space, degradation of the article placed therein can be delayed.

The sealing material 2 may not only bond the Mass plate 4 and the bowl-shaped glass member 5 by contacting their outer faces 14, as illustrated in FIG. 2(b), but may also bond the opposed surfaces 15 of the both members, as illustrated in FIG. 2(c). When at least one of the members to be bonded is curved, an internal space may be formed by contacting the to-be-bonded members to each other, and then bonding the members from outside with the sealing material so as to maintain airtightness.

When a plate having a curved surface is used as illustrated in FIG. 2, durability can be achieved even when the internal space is evacuated. Alternatively, rectangular members to be bonded may be used so as to form a columnar or cuboidal internal space, for example. Further alternatively, three or more members may be bonded.

When the article sealed inside is small or a liquid, for example, a single glass member 6 having an opening may be prepared as illustrated in FIG. 3, and the opening may be closed with the sealing material 2.

(Fabrication of Glass Compound)

Low melting point glass compounds (G1 to G31) for the sealing material were fabricated. The glass compounds according to the present invention do not include lead. The compositions and glass transition points of the fabricated glasses are shown in Table 1. The glasses were fabricated according to the following procedure.

Starting materials were weighed to achieve predetermined weight ratios. As the starting materials, oxide powders (purity 99.9%) from Kojundo Chemical Lab. Co., Ltd. were used. In some samples, as a Ba source and a P source, $Ba(PO_3)_2$ from Rasa Industries, Ltd. was used. The starting materials were mixed and placed in a platinum crucible. When the ratio of $Ag_2O$ in raw material was 40 mass % or greater, an alumina crucible was used. The crucible with the raw material mixed powder placed therein was installed in a glass melting furnace, and heated and fused. While increasing the temperature at the temperature-increase rate of 10° C./min, the glass being fused at a set temperature (700 to 950° C.) was retained while stirring for one hour. The crucible was then taken out of the glass melting furnace, and the glass was cast into a graphite mold that had been previously heated to 150° C. After cooling to room temperature, the glass was coarsely crushed, fabricating a glass compound frit. The glass compound frit had an average volume particle diameter of not more than 20 μm.

Figure 4:
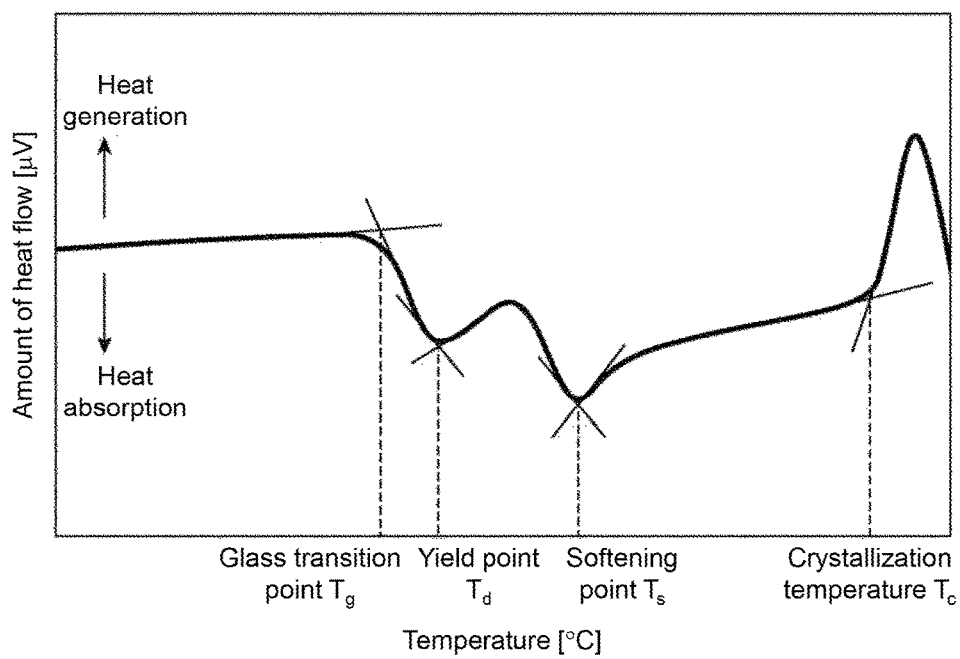
FIG. 4 illustrates an example of differential thermal analysis results, and how various characteristic temperatures are determined.

The characteristic temperature of the fabricated glass frit was measured by differential thermal analysis (DTA). At the temperature-increase rate of 5° C./min, data up to 600° C. were acquired. For the standard sample, alumina powder was used, and for a sample container, Al was used. FIG. 4 illustrates a representative DTA curve. As illustrated, the glass transition point ($T_g$) was the start temperature of a first heat absorption peak. Besides, as a first heat absorption peak temperature, a yield point ($M_g$) was determined; as a second heat absorption peak temperature, a softening point ($T_s$) was determined; and as a crystallization temperature, the start temperature ($T_c$) of a heat generating peak was determined. The temperature suitable for adhesion depends on the particle diameter of glass, the pressurization condition and retention time during bonding, and the like, and therefore cannot be defined as a rule; it is necessary, though, to achieve at least a temperature higher than the softening point $T_s$ corresponding to the viscosity=$10^{7.65}$ poise. The softening point $T_s$ may be considered to be a temperature higher than the glass transition temperature $T_g$ by approximately 50 to 100° C., depending on the glass compound.

The glasses included V and Te, and further at least one of P or Ag. More specifically, in oxide equivalents, V2O5 was 17 to 50 mass %; TeO2 was 20 to 33 mass %; and P2O5 was 4.8 to 12 mass %. Alternatively, V2O5 was 17 to 45 mass %; TeO2 was 25 to 40 mass %; and Ag2O was 20 to 45 mass %. These values enabled the glass transition temperature to be set at 160 to 340° C. Particularly, when the total of Ag2O, V2O5, and TeO2 in oxide equivalents was 85 mass % or greater of the glass compound, as for G11 to G31 in the table, very low values of glass transition temperature of 160 to 270° C. were obtained.

TABLE 1

| Glass | V$_2$O$_5$ | TeO$_2$ | Fe$_2$O$_3$ | P$_2$O$_5$ | Ag$_2$O | WO$_3$ | BaO | Sb$_2$O$_3$ | K$_2$O | Glass transition temperature [° C.] |
|---|---|---|---|---|---|---|---|---|---|---|
| | | | | Glass compound (mass %) | | | | | | |
| G1 | 50 | 32 | 10 | 8 | — | — | — | — | — | 263 |
| G2 | 50 | 30 | 10 | 6 | — | 4 | — | — | — | 257 |
| G3 | 45 | 30 | 15 | 10 | — | — | — | — | — | 308 |

TABLE 1-continued

| Glass | Glass compound (mass %) | | | | | | | | | Glass transition temperature [° C.] |
| --- | --- | --- | --- | --- | --- | --- | --- | --- | --- | --- |
| | $V_2O_5$ | $TeO_2$ | $Fe_2O_3$ | $P_2O_5$ | $Ag_2O$ | $WO_3$ | BaO | $Sb_2O_3$ | $K_2O$ | |
| G4 | 45 | 25 | 15 | 10 | — | 5 | — | — | — | 316 |
| G5 | 43 | 30 | 15 | 12 | — | — | — | — | — | 318 |
| G6 | 37 | 33 | 19 | 11 | — | — | — | — | — | 336 |
| G7 | 38 | 30 | — | 5.8 | — | 10 | 11.2 | — | 5 | 276 |
| G8 | 55 | 20 | — | 10 | — | — | 5 | 10 | — | 313 |
| G9 | 45 | 25 | — | 10 | — | — | 5 | 15 | — | 338 |
| G10 | 45 | 30 | — | 10.3 | — | 10 | 4.7 | — | — | 286 |
| G11 | 30 | 30 | — | 4.8 | 30 | — | 5.2 | — | — | 222 |
| G12 | 30 | 30 | — | 5 | 30 | 5 | — | — | — | 230 |
| G13 | 25 | 30 | — | 4.8 | 30 | 5 | 5.2 | — | — | 223 |
| G14 | 25 | 30 | — | 7.2 | 30 | — | 7.8 | — | — | 228 |
| G15 | 30 | 30 | — | 4.8 | 25 | 5 | 5.2 | — | — | 236 |
| G16 | 30 | 30 | 5 | 5 | 30 | — | — | — | — | 235 |
| G17 | 25 | 30 | 5 | 10 | 30 | — | — | — | — | 266 |
| G18 | 25 | 30 | 5 | 5 | 30 | 5 | — | — | — | 249 |
| G19 | 25 | 30 | — | 5 | 30 | 10 | — | — | — | 236 |
| G20 | 30 | 30 | — | 4.8 | 25 | 5 | 5.2 | — | — | 237 |
| G21 | 20 | 30 | — | 4.8 | 35 | 5 | 5.2 | — | — | 204 |
| G22 | 17 | 30 | — | 4.8 | 38 | 5 | 5.2 | — | — | 197 |
| G23 | 17 | 30 | — | — | 43 | 5 | 5 | — | — | 177 |
| G24 | 20 | 35 | — | — | 45 | — | — | — | — | 163 |
| G25 | 17 | 40 | — | — | 43 | — | — | — | — | 169 |
| G26 | 40 | 40 | — | — | 20 | — | — | — | — | 218 |
| G27 | 20 | 30 | — | — | 45 | 5 | — | — | — | 169 |
| G28 | 45 | 30 | — | — | 20 | 5 | — | — | — | 224 |
| G29 | 40 | 35 | — | — | 25 | — | — | — | — | 212 |
| G30 | 18 | 34 | — | — | 43 | — | 5 | — | — | 167 |
| G31 | 40 | 25 | — | — | 35 | — | — | — | — | 235 |

(Fabrication of Sealing Material Paste)

Sealing material pastes were fabricated using the glass compounds. Of the fabricated pastes, facts of pastes P1 to P14 in which glasses G4 and G25 were used are shown in Table 2. Glass compound frits were pulverized using a jet mill. The particle diameter of the resultant powder was 1 to 2 μm in volume weighted mean. Thereafter, the glass compounds and various fillers were mixed at predetermined compounding ratios. Mixing was performed using a agate mortar. With respect to the glass compounds G1 to G10, a solvent to which 4% of resin binder was added was mixed to prepare the paste. For the resin binder, ethyl cellulose was used; for the solvent, butyl carbitol acetate was used. Butyl carbitol acetate does not readily react with the glass compounds G1 to G10. However, because the solvent by itself has low viscosity and exhibits poor coating property, the resin binder was added. When heated to approximately 300° C., the ethyl cellulose can be caused to evaporate and removed without causing the glass compounds G1 to G10 to become soft and flow. In other words, the pastes using the glass compounds G1 to G10 were used by being coated on a bonding base material and then heated to approximately 300° C. so as to remove the solvent and resin binder.

Meanwhile, with respect to the glass compounds G11 to G31, only the solvent was mixed to prepare the paste. Herein, as the solvent, α terpineol was used. α terpineol does not readily react with the glass compounds G11 to G31; in addition, it has relatively high viscosity and can therefore provide good coating property without adding a resin binder. It should be noted that a terpineol cannot be used as a solvent with respect to the glass compounds G1 to G10 as it reacts with the compositions. α terpineol can be caused to evaporate when heated to approximately 100 to 150° C. and can be therefore removed without causing the glass compounds G11 to G31 to become soft and flow.

The material of the added filler was the three types of Sn-3.5Ag, Ag, and phosphoric acid zirconium tungstate (ZWP:$Zr_2(WO_4)(PO_4)_2$). Ag was prepared in two types, one with small particle diameter and the other with large particle diameter.

TABLE 2

| Paste | Glass | Filler material | Filler particle diameter (μm) | Filler melting point (° C.) | Filler volumetric compounding ratio |
| --- | --- | --- | --- | --- | --- |
| P1 | G4 | None | — | — | 0 |
| P2 | | Sn—3.5Ag | 40 | 221 | 0.3 |
| P3 | | | | | 0.5 |
| P4 | | | | | 0.7 |
| P5 | | Ag | 1 | 961 | 0.7 |
| P6 | | | 100 | | 0.7 |
| P7 | | ZWP | <10 | — | 0.3 |
| P8 | G25 | None | — | — | 0 |
| P9 | | Sn—3.5Ag | 40 | 221 | 0.2 |
| P10 | | | | | 0.3 |
| P11 | | | | | 0.4 |
| P12 | | Ag | 1 | 961 | 0.7 |
| P13 | | | 100 | | 0.7 |
| P14 | | ZWP | <10 | — | 0.3 |

(Evaluation of Bonding Property)

Bonding property of pastes P1 to P14 was evaluated according to the following procedure.

A material to be bonded 81 was a soda-lime glass with a thickness of 0.3 mm. The soda-lime glass plate was coated with the paste using a screen printing machine. A coating film 79 had a width of 2 mm (FIG. 5(a)). The coating film 79 had five different thicknesses of 10, 40, 70, 100, and 200 μm.

Pastes P1 to P7 were heated to 150° C. to evaporate butyl carbitol acetate, and then heated to 320° C. to remove ethyl cellulose, followed by pre-calcination under the condition of 400° C. for 10 min. Pastes P8 to P14 were heated to 150° C. to evaporate a terpineol, and then pre-calcined under the condition of 300° C. for 10 min.

Figure 5:
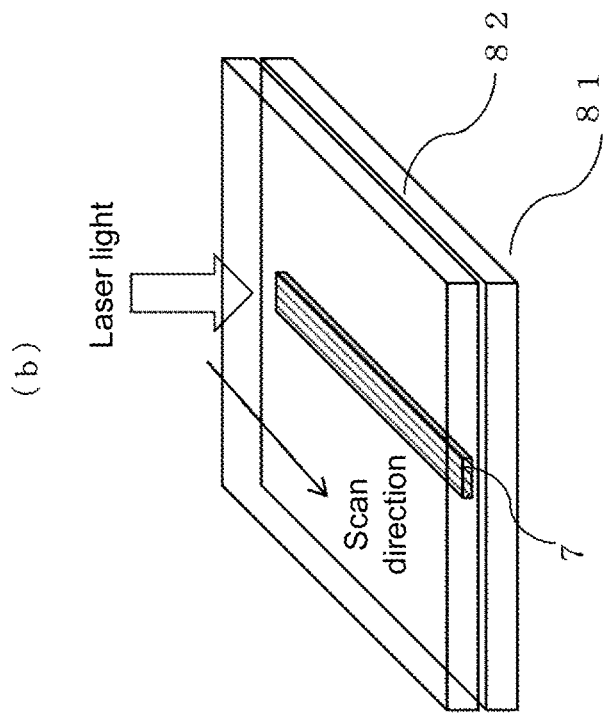
FIG. 5 illustrates a method for analyzing bonding property.
Figure 5:
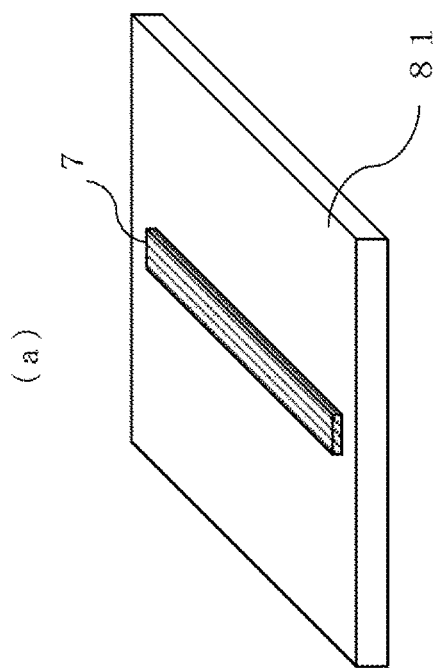

The coating film was further covered on top with the other soda-lime glass material to be bonded 82, and the coating film 7 was irradiated with laser from above the glass plate 82, as illustrated in FIG. 5(b). With the beam diameter fixed at 7 mm, laser output was gradually increased to investigate the best conditions.

The results of the experiments are shown in Table 3, where "Good" indicates good adhesion across the entire length after laser output adjustment, and "Poor" indicates absence of good adhesion no matter how the laser output was adjusted. No samples were fabricated under the condition in which the height of the coating film was smaller than the particle diameter of the filler, and such case is denoted by "-".

This is attributed to the fact that, when the filler contains ZWP having low thermal expansion coefficient, the thermal expansion coefficient of the sealing material becomes closer to that of the soda-lime glass, thereby providing good adhesion.

However, when the film thickness was greater than 70 μm, good adhesion was not obtained even if ZWP was used in the filler.

(C) When the Film Thickness is Large, Metallic Filler May Preferably be Added.

When the film thickness was on the order of 40 μm, good adhesion was obtained by controlling the thermal expansion coefficient. However, when the film thickness was greater than 70 μm, good adhesion could not be achieved. However, in pastes P3, 4, 11, and 13, good adhesion was obtained even when the film thickness was greater than 70 μm. These pastes commonly contain a metallic filler (metal material).

TABLE 3

| Paste | Glass | Filler material | Filler particle diameter (μm) | Filler volumetric compounding ratio | Results with respect to each film thickness | | | | |
|---|---|---|---|---|---|---|---|---|---|
| | | | | | 10 | 40 | 70 | 100 | 200 |
| P1 | G4 | None | — | 0 | Good | Good | Poor | Poor | Poor |
| P2 | | Sn—3.5Ag | 40 | 0.3 | — | Good | Poor | Poor | Poor |
| P3 | | | | 0.5 | — | Good | Good | Poor | Poor |
| P4 | | | | 0.7 | — | Good | Good | Poor | Poor |
| P5 | | Ag | 1 | 0.7 | Good | Good | Poor | Poor | Poor |
| P6 | | | 100 | 0.7 | — | — | — | Poor | Poor |
| P7 | | ZWP | <10 | 0.3 | Good | Good | Poor | Poor | Poor |
| P8 | G25 | None | — | 0 | Poor | Poor | Poor | Poor | Poor |
| P9 | | Sn—3.5Ag | 40 | 0.3 | — | Good | Poor | Poor | Poor |
| P10 | | | | 0.5 | — | Good | Good | Good | Poor |
| P11 | | | | 0.7 | — | Good | Good | Good | Good |
| P12 | | Ag | 1 | 0.7 | Good | Good | Poor | Poor | Poor |
| P13 | | | 100 | 0.7 | — | — | — | Good | Good |
| P14 | | ZWP | <10 | 0.3 | Good | Good | Poor | Poor | Poor |

From the results shown in Table 3, insights (A) to (E) were obtained.

(A) in the Absence of Filler, Glass with High Glass Transition Temperature should be Used.

When pastes P1 and P8 that did not contain filler are compared, in the case of paste P1 in which glass with high glass transition temperature was used, good adhesion was achieved even when the film thickness was increased to 40 μm.

The thermal expansion coefficient of glasses G1 to G10 was 8 to 16 ppm/K. The thermal expansion coefficient of glasses G11 to G31 was 13 to 18 ppm/K. The former glass, with a higher glass transition temperature, tends to have a lower thermal expansion coefficient than the latter glass. Meanwhile, the thermal expansion coefficient of soda-lime glass is 7 ppm/K. Accordingly, it is believed that in the sealing material with high glass transition temperature, the difference in thermal expansion coefficient from the glass base material is decreased, resulting in decreased residual stress after adhesion, and providing good adhesion.

However, when the film thickness was greater than 70 μm, good adhesion was not achieved even if paste P1 containing high glass transition temperature glass was used.

(B) When the Film Thickness is Small, ZWP May Preferably be Contained in the Filler.

In the case where glass G25 having low glass transition temperature was used, when paste P8 not containing the filler and paste P14 containing ZWP are compared, it can be seen that by using ZWP in the filler, good adhesion was obtained only when the film thickness was 40 μm or smaller.

According to the present invention, the metallic filler refers to a filler including a metal that has not formed an oxide. In the following, the reason for the effectiveness of the metallic filler content when the film thickness was large will be considered.

Figure 6:
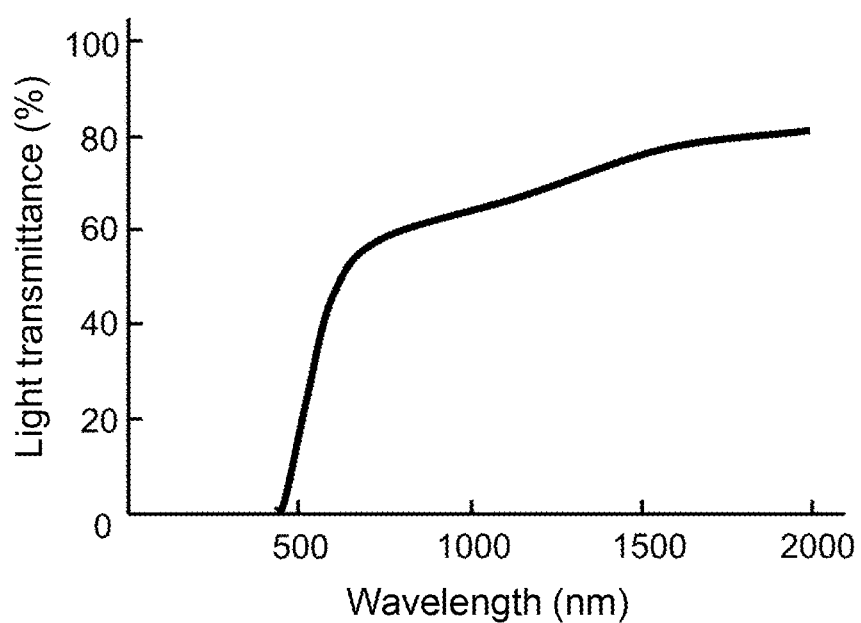
FIG. 6 illustrates the wavelength dependency of light transmittance in a developed glass.

FIG. 6 illustrates the wavelength dependency of light transmittance in the film with the thickness of 5 μm fabricated according to glass number 24. The result shows that, when laser with the wavelength of 1000 nm was used, for example, approximately 40% of the laser energy was absorbed at the depth of 5 μm from the laser irradiated side, so that approximately 60% of the laser energy reached regions of greater depths. Accordingly, when the film thickness is large, the amount of laser energy absorption significantly varies depending on the film depth. In addition, the thermal conductivity of the presently fabricated glasses was low at approximately 0.5 W/mK regardless of the composition, so that heat was not readily diffused. As a result, during heating by laser, large temperature non-uniformity is caused within the coating film. The temperature non-uniformity increases the residual stress after bonding, possibly causing bonding failure, such as a crack. However, it is believed that, when the metallic filler is added, the thermal conductivity of the sealing material is increased, whereby the non-uniform temperature distribution at the time of laser irradiation is mitigated, making it possible to obtain good adhesion. Examples of the metallic filler include not only those containing Ag or Sn but also those containing Cu, Al, Zn, Au, In, Bi, or Pt.

(D) When the Film Thickness is Large, Metallic Filler May be Added, and Further Glass with a Composition Having Low Glass Transition Temperature May Preferably be Used.

When pastes P3, 4, and 6 pastes P10, 11, and 13 are compared, good adhesion was obtained in the case of pastes P10, 11, and 13 even when the film thickness was greater than 100 µm. These pastes commonly had a metallic filler added therein, and in addition, they used glasses of compositions with low glass transition temperature. The use of glass with compositions with low glass transition temperature enables the amount of temperature increase required for adhesion at the time of laser irradiation to be reduced, whereby the temperature non-uniformity in the coating film is decreased. As a result, it is believed, the residual stress after adhesion was decreased, whereby adhesion failure was prevented.

(E) When the Film Thickness is Large, a Low Melting Point Metallic Filler should be Used, or a Metallic Filler with Large Particle Diameter should be Used.

Pastes P11, 12, and 13 are compared. Despite these pastes have the same ratio of metallic filler added to glass (glass: metallic filler=1:0.7), only P12 had a narrow range of bondable film thickness (i.e., good adhesion could not be obtained when the film thickness was large). When a metallic filler is added, the thermal conductivity of the sealing member is increased, making it easier to make the sealing member temperature uniform at the time of laser irradiation. On the other hand, when the amount of metallic filler added is increased, the flowability of the sealing member may deteriorate, resulting in an increase in voids or defects. Such disadvantages can be avoided by using a metallic filler having a lower melting point than the softening point of glass, or a metallic filler with large particle diameter.

Figure 7:
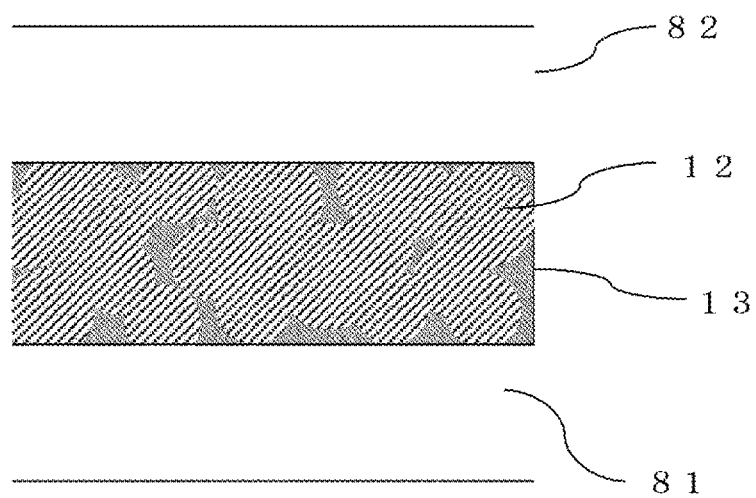
FIG. 7 shows cross sectional views of sealed structural bodies, (a) illustrating a case where a low melting point metallic filler is used, and (b) illustrating a case where a metallic filler with a large particle diameter is used.
Figure 7:
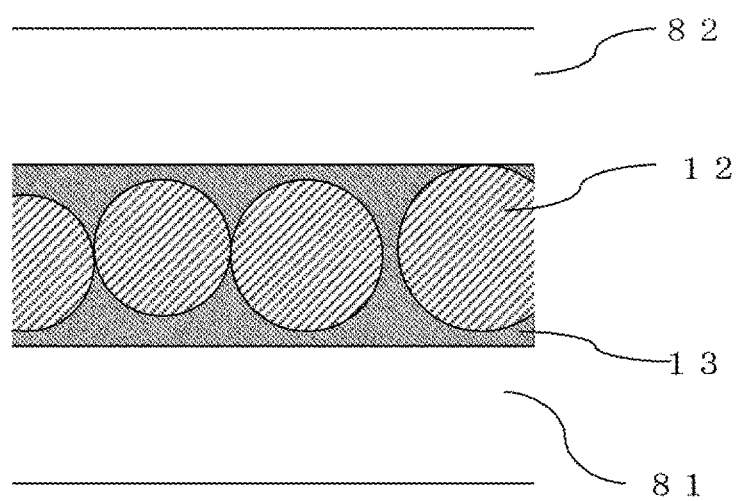

When the metallic filler having a lower melting point than the softening point at which glass begins to flow is selected, a decrease in flowability can be mitigated and formation of good adhesion can be facilitated. When the metallic filler with low melting point is used, the sealed structural body has a cross section as illustrated in FIG. 7(a). The metallic filler 12 between the materials to be bonded 81, 82 is melted by laser heating, whereby the metallic filler portions are bonded to each other, and gaps of the metallic filler 12 are filled with glass 13. However, the heating time of laser irradiation is short, so that the original particle shape is maintained.

When the particle diameter of the metallic filler is large, the gaps between the metallic filler particles are increased, whereby the glass that has become soft and flowable can readily penetrate the gaps. As a result, the glass that has become soft and flowable can penetrate the gaps of the metallic filler particles sufficiently, making it possible to obtain good adhesion. Preferably, the metallic filler may be used in a range of 0.5 to 1 times the thickness of the coating film. When this range of size of the metallic filler is used, the metallic filler 12 will have an aligned structure as illustrated in FIG. 7(b). The energy supplied by laser irradiation via the metallic filler can extend from the laser irradiated surface to far regions, achieving a uniform temperature distribution.

The above analysis of sealing property will be summarized. An important point when the film thickness is thin is to align the thermal expansion coefficient between the base material and the sealing member as much as possible. However, when the film thickness is large, good adhesion cannot be obtained if only the thermal expansion coefficient is considered. This is because the energy density of laser absorbed by the coating film is attenuated with respect to the film depth direction, whereby the internal temperature distribution of the coating film becomes greatly non-uniform.

The inventors have discovered that in order to prevent such temperature distribution non-uniformity, it is effective to mix a metallic filler in the sealing member. The inventors have also discovered that it is effective to use a glass compound containing V, Te, and Ag as components and having a low glass transition temperature. In addition, it has also been discovered that a metallic filler with a low melting point or a large particle diameter can be effectively used.

That good bonding can be obtained when the film thickness is increased provides the following advantages. First, in the case of the structure in which two glass plates are bonded, as illustrated in FIG. 1, the thickness of the internal space can be increased. Secondly, bonding can also be achieved when the sealing structure is such that, as illustrated in FIGS. 2 and 3, it is difficult to control the thickness of the bonding material paste. In the following, an embodiment utilizing such advantages will be described.

(Embodiment in the Case of Double Insulating Glass)

Figure 8:
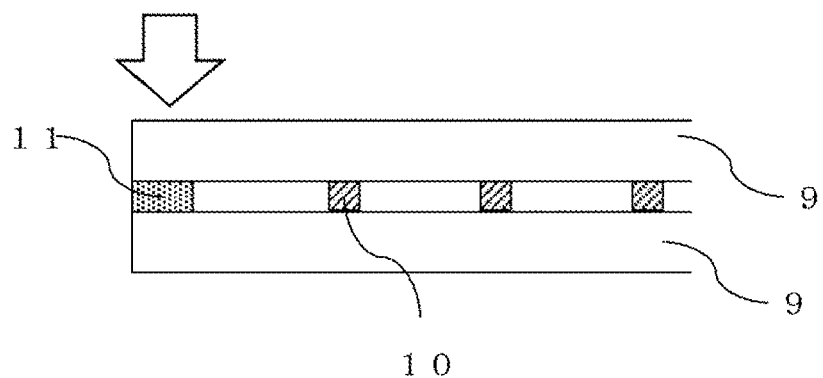
FIG. 8 shows cross sectional views of double insulating glasses, (a) illustrating a case where sealing material is disposed between two glass plates, and (b) illustrating a case where sealing material is disposed on the outside.
Figure 8:
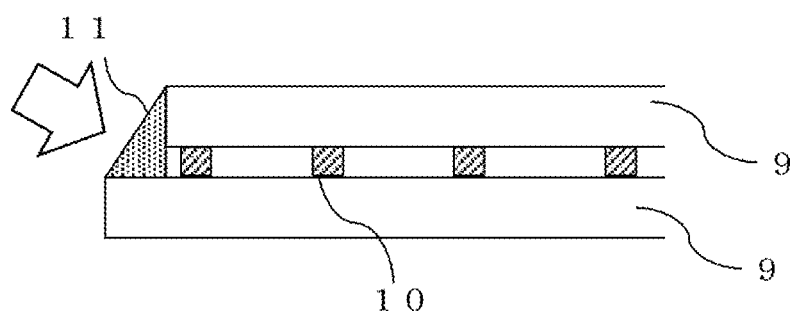

FIG. 8 illustrates a cross sectional structure of a double insulating glass. The modes of heat transmission between the two glass plates 9 include thermal conduction and convection by the gas in the space, and radiation in the form of electromagnetic wave energy. Assuming that the interior of the space is a vacuum (an atmosphere with reduced pressure relative to the atmospheric air), the thermal conduction and convection by gas are eliminated, so that the thermal insulating performance can be increased. However, when the space is a vacuum, it is difficult to maintain an interval between the two glass plates because of external pressure. Accordingly, a spacer 10 is installed in the space. In this case, the thermal conduction by the spacer 10 poses a factor causing a decrease in thermal insulating property. In order to prevent the increase in thermal insulating performance by the evacuated space from being cancelled by the thermal conduction due to the spacer 10, it is necessary to provide a gap of at least 0.1 mm and preferably 0.2 mm between the two glass plates 9. Further, in order to maintain the vacuum in the space, the sealing material employs a material with excellent gas barrier property, such as low melting point glass. The sealing material 11 may be sandwiched between the two glass plates as illustrated in FIG. 8(a), or disposed at the end of one of the glasses, as illustrated in FIG. 8(b). In either case, in the double insulating glass, it is necessary to separate the two glass plates 9 from each other, and to use a thick film for the sealing material 11. Accordingly, when manufacturing by laser heating, the above-described insights (C) to (E) may preferably be utilized. The double insulating glass can be fabricated by the following method, for example.

After paste P11 is coated on the outer periphery of a soda-lime glass plate with a thickness of 3 mm, heating is performed at 150° C. to evaporate a terpineol, followed by pre-calcination at 300° C. for 10 minutes. The thickness of the spacer may be 0.2 mm, and the thickness of the coating film may be 0.25 mm. Another soda-lime glass plate with a thickness of 3 mm is placed and scanned along the coating film with laser with a wavelength of 1030 nm. Due to the weight of the soda-lime glass plate, as laser scan proceeds, the coating film becomes molten and spreads until the interval of the two Mass plates becomes equal to the height of the spacer, i.e., 0.2 mm One of the soda-lime glass plates is provided with a vacuum exhaust opening in advance. After the internal air is discharged via the opening using a rotary pump, the vacuum exhaust opening can be melted by a gas burner to achieve a vacuum seal. Alternatively, laser scan may be performed in the vacuum, whereby vacuum seal can be achieved without subsequent evacuation. In this case, the need for providing the vacuum exhaust opening can be eliminated, which may be preferable in terms of exterior view.

Thus, using laser heating during manufacture of the double insulating glass provides the advantage that a thermally sensitive article can be installed between the two glass plates. For example, the window glass can be provided with a new function by affixing a film with a dimmer, anti-reflection, or heat ray reflection function on the inside of one of the glass plates. In addition, because the film is installed on the vacuum heat-insulated layer, degradation by moisture or dust can be prevented. Alternatively, an illumination element, an image display element, or the like may be installed on the vacuum heat-insulated layer. In the case of store windows of shops and the like, the internal merchandise may be illuminated by the illumination element or information about the merchandise may be projected on the image display element as needed so as to enable confirmation of the merchandise. Such configuration may be preferably used in a commercial facility.

(Embodiment as a Preservation Container for Insect Specimen or Fresh Flowers)

Insect specimen, fresh flowers, and the like, if kept in the atmospheric air, tend to lose color or shape due to oxidation or moisture absorption. Accordingly, for such purposes, it is desirable to lower humidity and preserve the content in an inert atmosphere.

In a method for sealing insect specimen, fresh flower and the like in an inert gas in such a way as to enable internal observation at any time, the insect specimen or the fresh flower is installed in an internal space formed between the glass plate 4 as a bottom plate and the bowl-shaped glass member 5, as illustrated in FIG. 2, the bottom plate and the hemispherical transparent member are adhered each other with the sealing material, and then an inert gas such as argon is sealed in the internal space 3, for example. For the glass plate 4, the bowl-shaped glass member 5, and the sealing material 2, it is preferable to use glass with its superior gas barrier property, rather than organic material, such as resin. However, while the insect specimen and fresh flower are sensitive to heat, the glass sealing material needs to be heated to the glass melting temperature during the sealing process. In this case, by utilizing laser heating, only the sealing material portion can be heated and melted without causing damage to the internal insect specimen or fresh flower. The sealing material may be simply coated along the outer edge of the hemispherical transparent member, as illustrated in FIG. 8. However, it is very difficult to coat such a form of coating film with a uniform thickness, and therefore it is also difficult to uniformly heat the sealing material during laser heating. Accordingly, the above-described insights (C) to (E) may be utilized. Preservation of the insect specimen, fresh flower and the like can be achieved by the following method, for example.

The insect specimen or fresh flower is placed on a soda-lime glass bottom plate. After the atmosphere is replaced with an inert gas such as argon, a soda-lime Mass hemispherical transparent member is placed thereon. The outer peripheries of the bottom plate and the hemispherical transparent member are coated with paste P11. Along the coated paste, laser with a wavelength of 1030 nm is scanned. As a result, the solvent in the paste is evaporated and the glass particles and tin particles are melted, whereby the bottom plate and the hemispherical transparent member become adhered to each other, while separating the internal space from the outside. Thereafter, the inert gas sealed state can be maintained even when placed in the atmospheric air.

REFERENCE SIGNS LIST

1 Glass plate
2 Sealing material
3 Internal space
4 Glass plate
5 Bowl-shaped glass member
6 Glass member
7 Coating film
81 Material to be bonded
82 Material to be bonded
9 Glass plate
10 Spacer
11 Sealing material
12 Metallic filler
13 Lead-free glass compound
14 Outer face
15 Opposed surface

The invention claimed is:

1. A sealed structural body including an internal space and made of glass, wherein:
   at least a part of a boundary between the internal space of the sealed structural body and an outside is separated by a sealing material containing a metal material and a lead-free oxide glass, the lead-free oxide glass containing Te, V, and at least one of element Ag or P,
   the metal material has a lower melting point than a softening point at which the lead-free oxide glass begins to flow,
   the metal material has a crystalline structure,
   the lead-free oxide glass has a non-crystalline structure,
   the metal material maintains an original particle shape,
   a particle diameter of the metal material is 0.5 to 1 times the thickness of the internal space, and
   the internal space has a thickness of 70 μm or greater.

2. The sealed structural body according to claim 1, wherein the lead-free oxide glass comprises 17 to 45 mass % of $V_2O_5$, 25 to 40 mass % of $TeO_2$, and 20 to 45 mass % of $Ag_2O$ in oxide equivalents.

3. The sealed structural body according to claim 1, wherein the lead-free oxide glass comprises 85 mass % or greater of $V_2O_5+TeO_2+Ag_2O$ in oxide equivalents.

4. The sealed structural body according to claim 1, wherein the lead-free oxide glass comprises 17 to 50 mass % of $V_2O_5$, 20 to 33 mass % of $TeO_2$, and 4.8 to 12 mass % of $P_2O_5$ in oxide equivalents.

5. The sealed structural body according to claim 1, wherein the metal material includes at least one of Ag, Cu, Al, Sn, Zn, Au, In, Bi, or Pt.

6. The sealed structural body according to claim 1, wherein the metal material has the melting point lower than the softening point of the lead-free oxide glass.

7. The sealed structural body according to claim 1, wherein the sealed structural body includes two glass plates with outer periphery portions thereof bonded by the sealing material so as to form the internal space.

8. The sealed structural body according to claim 7, wherein the metal material has an average particle diameter of 0.5 to 1 times the interval of the internal space.

9. The sealed structural body according to claim 7, wherein the internal space has a reduced pressure compared with an atmospheric air.

10. The sealed structural body according to claim 1, wherein the sealed structural body includes a plurality of glass members of which at least one glass member has a curved surface, wherein the plurality of glass members are bonded by the sealing material so as to form the internal space.

11. The sealed structural body according to claim 10, wherein the internal space is an inert atmosphere.

* * * * *